(12) United States Patent
Barrick et al.

(10) Patent No.: US 10,412,877 B2
(45) Date of Patent: Sep. 17, 2019

(54) CYLINDER PRESSURE BASED POSITION CONTROL OF AN IMPLEMENT STABILIZER WHEEL

(71) Applicant: CNH Industrial Canada, Ltd., Saskatoon (CA)

(72) Inventors: Christopher Barrick, Morton, IL (US); John Endsley, Washington, IL (US); James W. Henry, Saskatoon (CA); Tracey Meiners, Mackinaw, IL (US); Kevin McKee, Naperville, IL (US); John Posselius, Ephrata, PA (US); Kena Shah, Woodridge, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 254 days.

(21) Appl. No.: 15/635,542

(22) Filed: Jun. 28, 2017

(65) Prior Publication Data

US 2019/0000005 A1 Jan. 3, 2019

(51) Int. Cl.
| | | |
|---|---|---|
| *A01B 63/22* | (2006.01) | |
| *A01B 63/00* | (2006.01) | |
| *A01B 5/04* | (2006.01) | |
| *A01B 73/04* | (2006.01) | |
| *A01B 49/02* | (2006.01) | |

(52) U.S. Cl.
CPC ............... *A01B 63/22* (2013.01); *A01B 5/04* (2013.01); *A01B 63/002* (2013.01); *A01B 49/027* (2013.01); *A01B 73/044* (2013.01)

(58) Field of Classification Search
CPC ....... A01B 21/08; A01B 69/022; A01B 63/22; A01B 63/002; A01B 63/32; A01B 63/008; A01B 63/16; A01B 63/166; A01B 49/027; A01B 5/04; A01B 73/00; A01B 73/02; A01B 73/065; A01B 73/044; A01B 67/005; A01C 5/06; B60T 8/1708; B60T 8/17554
USPC ..... 172/1–11, 311, 452, 481, 456, 467, 316, 172/326–328, 395, 423, 668
See application file for complete search history.

(56) References Cited

U.S. PATENT DOCUMENTS

| | | | |
|---|---|---|---|
| 5,086,847 A | * | 2/1992 | Meiners ................. A01B 63/22 172/240 |
| 6,112,827 A | | 9/2000 | Reiber et al. |

(Continued)

FOREIGN PATENT DOCUMENTS

| | | |
|---|---|---|
| CN | 204518526 U | 8/2015 |
| JP | 2002238309 A | 8/2002 |

(Continued)

*Primary Examiner* — Robert E Pezzuto
(74) *Attorney, Agent, or Firm* — Rebecca L. Henkel; Rickard K. DeMille

(57) ABSTRACT

A remotely positionable stabilizer wheel arrangement for a towable agricultural implement utilizes a control unit that receives an input signal indicative of a desired position of the stabilizer wheel, and/or a desired depth of penetration of tillage tools operatively attached to the front and rear of the implement frame, to automatically control a hydraulic positioning cylinder of the remotely positionable stabilizer wheel arrangement to position and hold the stabilizer wheel at the desired position of the stabilizer wheel, by controlling pressure in the hydraulic cylinder to hold the stabilizer wheel at a target position determined from the desired position input signal.

20 Claims, 5 Drawing Sheets

(56) References Cited

U.S. PATENT DOCUMENTS

| | | | |
|---|---|---|---|
| 6,125,775 A | 10/2000 | Gust | |
| 6,164,385 A | 12/2000 | Buchl | |
| 6,263,977 B1 | 7/2001 | Mayerle et al. | |
| 6,378,619 B2 | 4/2002 | Mayerle et al. | |
| 6,389,999 B1 | 5/2002 | Duello | |
| 6,758,284 B2 | 7/2004 | Myers | |
| 6,810,968 B2 | 11/2004 | Myers | |
| 7,222,475 B2 | 5/2007 | Bomleny et al. | |
| 7,640,874 B2 * | 1/2010 | Hoehn | A01B 49/06 111/66 |
| 7,661,251 B1 | 2/2010 | Sloan et al. | |
| 7,673,570 B1 | 3/2010 | Bassett | |
| 8,275,525 B2 | 9/2012 | Kowalchuk et al. | |
| 8,291,997 B2 * | 10/2012 | Kovach | A01B 21/08 172/395 |
| 8,453,947 B2 * | 6/2013 | Martin | A01B 63/16 239/163 |
| 8,534,373 B2 * | 9/2013 | Van Buskirk | A01B 29/048 172/166 |
| 8,544,397 B2 | 10/2013 | Bassett | |
| 8,636,077 B2 | 1/2014 | Bassett | |
| 8,776,908 B2 | 7/2014 | Maro et al. | |
| 8,794,344 B2 | 8/2014 | Blunier et al. | |
| 8,893,816 B2 | 11/2014 | Maro et al. | |
| 9,144,189 B2 | 9/2015 | Stoller et al. | |
| 9,200,644 B2 | 12/2015 | Barfels et al. | |
| 9,307,688 B2 * | 4/2016 | Adams | A01C 7/203 |
| 2008/0093093 A1 | 4/2008 | Sheppard et al. | |
| 2008/0110649 A1 | 5/2008 | Connell et al. | |
| 2011/0313575 A1 | 12/2011 | Kowalchuk et al. | |
| 2015/0217619 A1 | 8/2015 | Benevelli et al. | |
| 2015/0264857 A1 | 9/2015 | Achen et al. | |

FOREIGN PATENT DOCUMENTS

| | | |
|---|---|---|
| RU | 2549781 C2 | 4/2015 |
| WO | 2015014345 A1 | 2/2015 |

\* cited by examiner

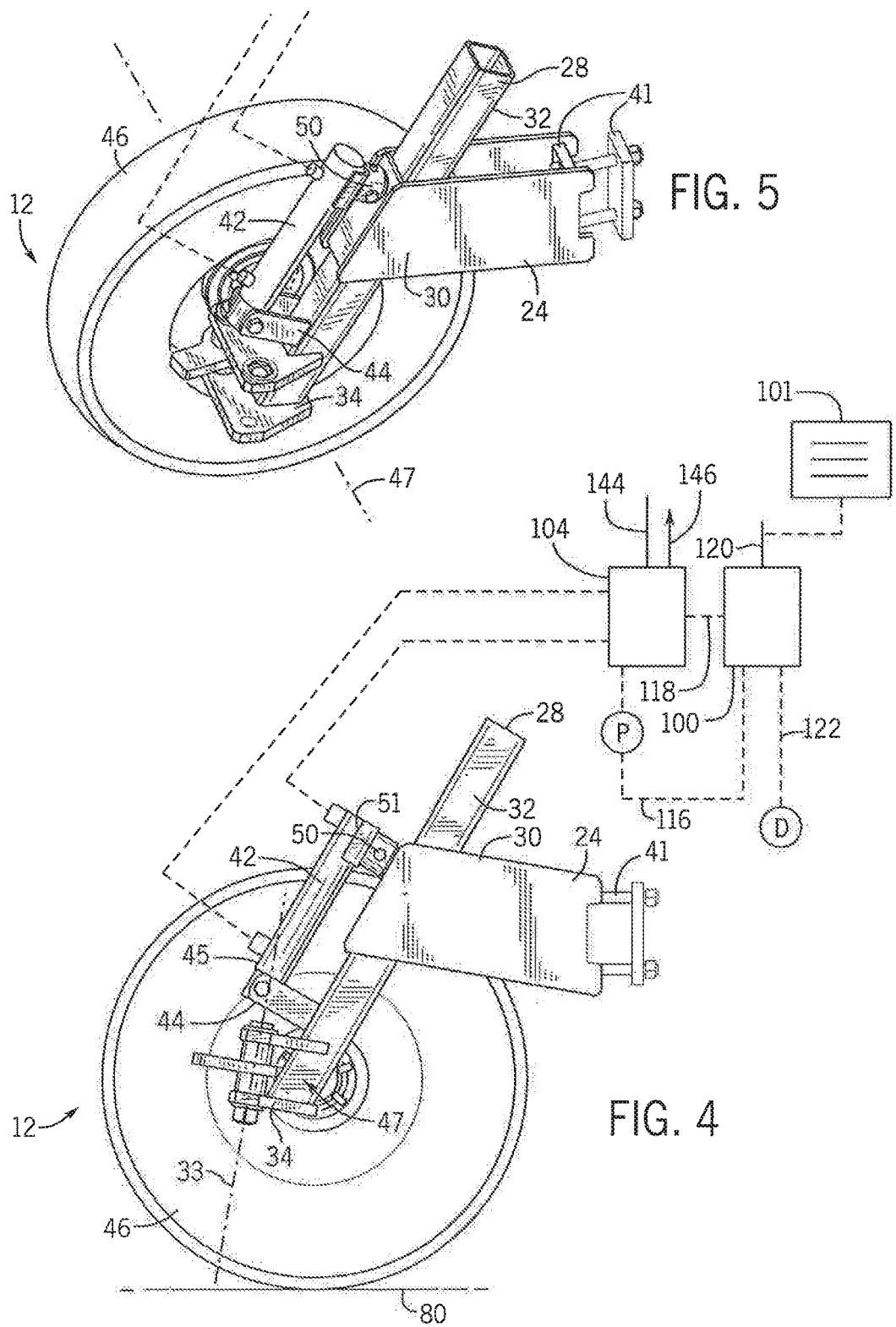

CYLINDER PRESSURE BASED POSITION CONTROL OF AN IMPLEMENT STABILIZER WHEEL

FIELD OF THE INVENTION

This invention relates generally to towable agricultural implements such as tillage equipment and other wide implements, towed behind a towing vehicle such as a tractor, and more specifically to actively controlling positioning of stabilizer wheels utilized in such implements during operation of the implement.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being tilled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on or close to the ground surface, to damp any bouncing tendencies, and to provide additional support to preclude having the outer ends of the tillage tools dig too deeply into the ground surface during turning or maneuvering the wide tillage implement around obstacles during tillage operations. To improve maneuverability, such stabilizer wheels are sometimes configured to pivot during turning and maneuvering.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement. Having the stabilizer wheels properly positioned to bear only lightly on the ground surface typically enhances the ability of pivotable stabilizer wheels to move as desired under forces exerted by the ground surface during turning and maneuvering of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks, by an operator or an operator's assistant standing on the ground. Alternatively, manually operated hydraulic cylinders have been used to position the stabilizer wheels on some tillage implements.

While these prior manual approaches have been successful in the past, they are cumbersome, undesirably time-consuming—particularly where an operator's assistant is needed—and, prone to adjustment error. Further improvement is desirable.

It is specifically desirable to provide an approach to positioning stabilizer wheels that can be carried out remotely by an operator seated in the towing vehicle, without the need for the operator to dismount from the towing vehicle, and without having an assistant on the ground. It is also desirable to provide an approach that allows the stabilizer wheels to be automatically, rather than manually, positioned in response to a simple command from an operator in the cab of the towing vehicle. It is further desirable that the stabilizer wheels be automatically adjusted in response to changes in depth of tillage. It is yet further desirable that an improved approach provide capability for remote, automatic and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position.

It is particularly desirable that an improved approach to remotely and automatically positioning a stabilizer wheel be readily adaptable and widely usable with older and present tractors and towing vehicles without resort to complex and costly system additions or upgrades, or reliance on communication protocols such as the emerging ISOBUS Class 3 which is not currently widely utilized in agricultural equipment.

SUMMARY OF THE INVENTION

The invention provides a remotely positionable stabilizer wheel arrangement for a towable agricultural implement that utilizes a control unit receiving an input signal indicative of a desired position of the stabilizer wheel, and/or a desired depth of penetration of tillage tools operatively attached to the front and rear of the implement frame, to control the position of the stabilizer wheel in a manner that is more precise, effective and efficient that was previously possible. A hydraulic positioning cylinder of the remotely positionable stabilizer wheel arrangement remotely positions, and then automatically holds the stabilizer wheel at the desired position of the stabilizer wheel, by controlling pressure in the hydraulic cylinder to hold the stabilizer wheel at a target position determined from the desired position input signal.

In one form of the invention, a remotely positionable stabilizer wheel arrangement is provided for an agricultural tillage implement having an implement frame supported above a ground surface by implement support wheels operatively connected to the frame by a depth control arrangement. The stabilizer wheel arrangement includes a support strut, a stabilizer wheel, a support strut bracket, a hydraulic cylinder, a hydraulic control arrangement, and a control unit.

The support strut has a first end adapted for mounting the stabilizer wheel to the support strut. The stabilizer wheel is operatively attached to the first end of the strut and adapted for engaging the ground surface. The support strut bracket is adapted for attachment to the implement frame and for slidable engagement with a second end of the support strut. The hydraulic cylinder has a first end of the cylinder operatively attached to the support strut, and a second end operatively attached to the support strut bracket for extension and retraction of the strut, with respect to the strut bracket, by corresponding extension and retraction of the hydraulic cylinder to thereby lower and raise the stabilizer wheel into and out of contact with the ground surface.

The hydraulic control arrangement is operatively connected to the hydraulic cylinder for providing pressurized hydraulic fluid at a desired hydraulic cylinder fluid pressure to control extension and retraction of the cylinder in response to a cylinder control electrical signal. The hydraulic pressure sensor is operatively connected for indicating a present hydraulic cylinder fluid pressure in the hydraulic cylinder. And, the control unit operatively connected to the pressure sensor and the hydraulic control arrangement for receiving the present hydraulic cylinder fluid pressure signal and a desired stabilizer wheel cylinder fluid pressure input signal. The control unit is also configured for providing the cylinder control electrical signal to the hydraulic control arrangement, to thereby regulate and hold the current stabilizer wheel hydraulic cylinder fluid pressure at the desired stabilizer wheel hydraulic cylinder fluid pressure.

In some forms of the invention, the control unit may cause the hydraulic cylinder to contract in response to an increase in hydraulic pressure measured by the pressure sensor, and thereby retract the stabilizer wheel to a position closer to the frame of the implement, and, the control unit may also cause the hydraulic cylinder to expand in response to a decrease in hydraulic pressure measured by the pressure sensor, and thereby extend the stabilizer wheel to a position farther from the frame of the implement.

In some forms of the invention, the control unit may select a predetermined desired stabilizer wheel hydraulic cylinder fluid pressure corresponding to a desired stabilizer wheel position input and controls the hydraulic power source using the predetermined stabilizer wheel hydraulic cylinder fluid pressure. Alternatively, the control unit may be configured to compute a computed desired stabilizer wheel hydraulic cylinder pressure corresponding to a desired stabilizer wheel position input and controls the hydraulic power source using the computed desired stabilizer wheel hydraulic cylinder pressure. A control unit may be configured for use where the desired stabilizer wheel position input is an incremental adjustment to a previous desired stabilizer wheel position.

In some forms of the invention, the control unit may be configured for receiving a desired depth electrical signal, and for providing a cylinder control signal to the hydraulic control arrangement corresponding to a desired stabilizer wheel hydraulic cylinder pressure at the desired depth, to thereby cause the hydraulic cylinder to hold the stabilizer wheel hydraulic cylinder pressure at the desired stabilizer wheel hydraulic cylinder pressure corresponding to the desired depth signal. The control unit may select a predetermined desired stabilizer wheel hydraulic cylinder pressure corresponding to the desired depth electrical signal, and control the hydraulic power source using the selected predetermined desired stabilizer wheel hydraulic cylinder pressure. Alternatively, the control unit may compute a computed desired stabilizer wheel hydraulic cylinder pressure corresponding to the desired depth input and controls the hydraulic power source using the computed desired stabilizer wheel hydraulic cylinder pressure. A control unit may be configured for use where the desired depth input is an incremental adjustment to a previous depth input.

In practicing the invention, the stabilizer wheel position may be adjustable independently from the position of the implement support wheels and the depth control arrangement.

A control unit, according to the invention may take a variety of forms including electronic, electrical and non-electrical, and analog and digital forms, in some forms of the invention, the control unit may be mounted on implement, to preclude the necessity for operation with an ISOBUS Class 3 equipped tractor. The invention may also be configured, however, for operation using the ISOBUS Class 3 protocol.

The invention may take the form of an agricultural tillage implement, or a method that includes a remotely adjustable stabilizer wheel arrangement, according to the invention.

A method, according to the invention may include holding the stabilizer wheel at the target stabilizer wheel position by controlling pressure in the hydraulic cylinder to hold the stabilizer wheel at a target position determined from the desired position input signal.

In some forms of the invention, a method is provided for remotely positioning a stabilizer wheel arrangement for an agricultural tillage implement having an implement frame supported above a ground surface by implement support wheels operatively connected to the frame by a depth control arrangement, where the stabilizer wheel arrangement includes a support strut having a first end adapted for mounting a stabilizer wheel on the strut, a stabilizer wheel operatively attached to the first end of the strut and adapted for engaging the ground surface, and a support strut bracket attached to the implement frame and configured for slidable engagement with a second end of the support strut. Such a method may include one or more steps such as: (a) operatively attaching a first end of a hydraulic cylinder to the support strut, and a second end thereof to the support strut bracket for extension and retraction of the strut with respect to the strut bracket by corresponding extension and retraction of the hydraulic cylinder to thereby lower and raise the stabilizer wheel in to and out of contact with the ground surface; (b) operatively connecting a hydraulic control arrangement to the hydraulic cylinder and providing pressurized hydraulic fluid at a desired hydraulic cylinder fluid pressure for controlling extension and retraction of the cylinder in response to a cylinder control electrical signal;

(c) operatively connecting a hydraulic pressure sensor for indicating a present hydraulic cylinder fluid pressure in the hydraulic cylinder; and, (d) operatively connecting a control unit to the pressure sensor and the hydraulic control arrangement for receiving the present hydraulic cylinder fluid pressure signal and a desired stabilizer wheel cylinder fluid pressure input signal, and providing the cylinder control electrical signal to the hydraulic control arrangement, to thereby regulate and hold the current stabilizer wheel hydraulic cylinder fluid pressure at the desired stabilizer wheel hydraulic cylinder fluid pressure.

A method for remotely positioning a stabilizer wheel, according to the invention may include causing the hydraulic cylinder to contract in response to an increase in hydraulic pressure measured by the pressure sensor, and thereby retract the stabilizer wheel to a position closer to the frame of the implement, and causing the hydraulic cylinder to expand in response to a decrease in hydraulic pressure measured by the pressure sensor, and thereby extend the stabilizer wheel to a position farther from the frame of the implement.

A method for remotely positioning a stabilizer wheel, according to the invention, may include controlling the stabilizer wheel at a desired position determined by at least one step from the group of the steps consisting of (a) selecting a predetermined desired stabilizer wheel hydraulic cylinder fluid pressure corresponding to a desired stabilizer wheel position input and controlling the hydraulic power source using the predetermined stabilizer wheel hydraulic cylinder fluid pressure; (b) computing a computed desired stabilizer wheel hydraulic cylinder pressure corresponding to a desired stabilizer wheel position input and controls the hydraulic power source using the computed desired stabilizer wheel hydraulic cylinder pressure; or (c) making an incremental adjustment to a previous desired stabilizer wheel hydraulic cylinder pressure.

In forms of the invention having a control unit that is configured for receiving a desired tillage depth signal, a method for practicing the invention may further include additional steps, such as: (a) receiving a desired depth electrical signal, and for providing a cylinder control signal to the hydraulic control arrangement corresponding to a desired stabilizer wheel hydraulic cylinder pressure at the desired depth, to thereby cause the hydraulic cylinder to hold the stabilizer wheel hydraulic cylinder pressure at the desired stabilizer wheel hydraulic cylinder pressure corresponding to the desired depth signal; (b) selecting a predetermined desired stabilizer wheel hydraulic cylinder pressure corresponding to the desired depth electrical signal, and controlling the hydraulic power source using the selected predetermined desired stabilizer wheel hydraulic cylinder pressure; (c) computing a computed desired stabilizer wheel hydraulic cylinder pressure corresponding to the desired depth input and controlling the hydraulic power source using the computed desired stabilizer wheel hydraulic cylinder pressure; or (d) determining a desired stabilizer wheel hydraulic cylinder pressure corresponding to an incremental change in the desired depth input and controlling the hydraulic power source using the determined desired stabilizer wheel hydraulic cylinder pressure corresponding to the incremental change in the desired depth input.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the invention. In the drawings:

FIG. 4 is a partly schematic orthographic side view of an exemplary embodiment of a left remotely positionable stabilizer wheel arrangement, as viewed from the left front corner of exemplary embodiment of the implement of FIG. 1, with a hitch of the implement for attachment to a towing vehicle defining the front of the implement, and left and right sides of the implement being as viewed by a person standing at the rear of the implement looking forward toward the hitch;

FIG. 5 is an isometric view of a portion of the exemplary embodiment of a remotely positionable stabilizer wheel arrangement of FIG. 4.

While the invention is described herein in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
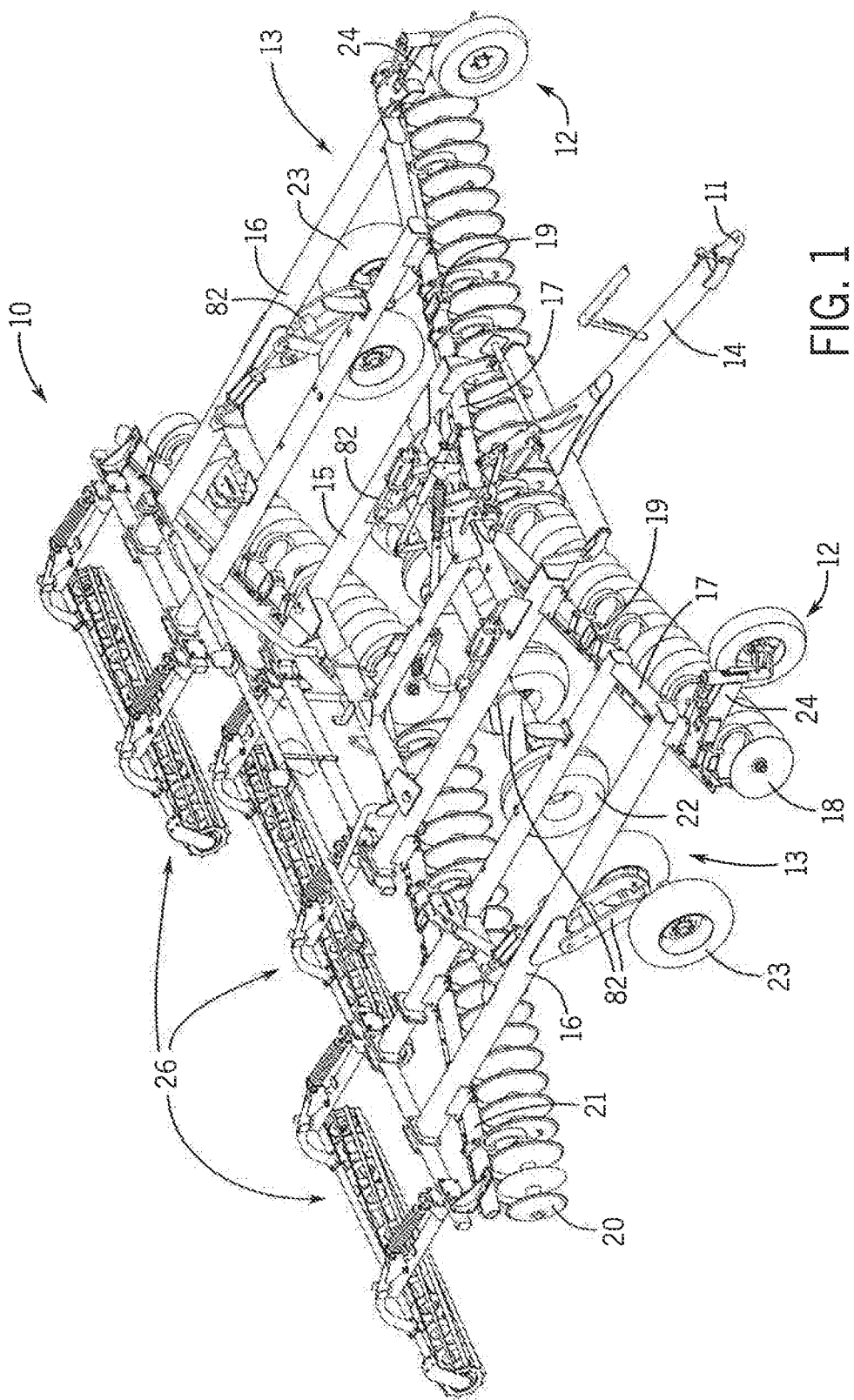
FIG. 1 is an isometric view of a towable agricultural tillage implement, according to the invention.

FIG. 1 shows an exemplary embodiment of a towable agricultural implement, according to the invention, in the form of a tandem disk 10, including a pair of left and right remotely adjustable stabilizer wheel arrangements 12,12. The disk 10 includes a hitch 14, which has a distal end 11 that is adapted for operative attachment to a towing vehicle, such as a tractor. The disk 10 has a frame 16 that includes a pair of left and right floating wings 13,13 connected to a central main section 15 of the frame 16 by a plurality of hinged joints 19. The disk 10 also includes segmented front and rear tillage tools, in the form of front and rear disk gangs 18, 20, that are operatively joined to the frame 16 by front and rear segmented tool bars 17,21 respectively. The tool bars 17,21 and disk gangs 18,20 are segmented and attached to the main frame 16 and wing frames 13,13 in a manner that allows the wing frames 13,13 and the segments of the front and rear disk gangs 18,20 to be folded above the center section 15 of the frame 16, to thereby narrow the disk 10 for transport on public roadways.

Figure 2:
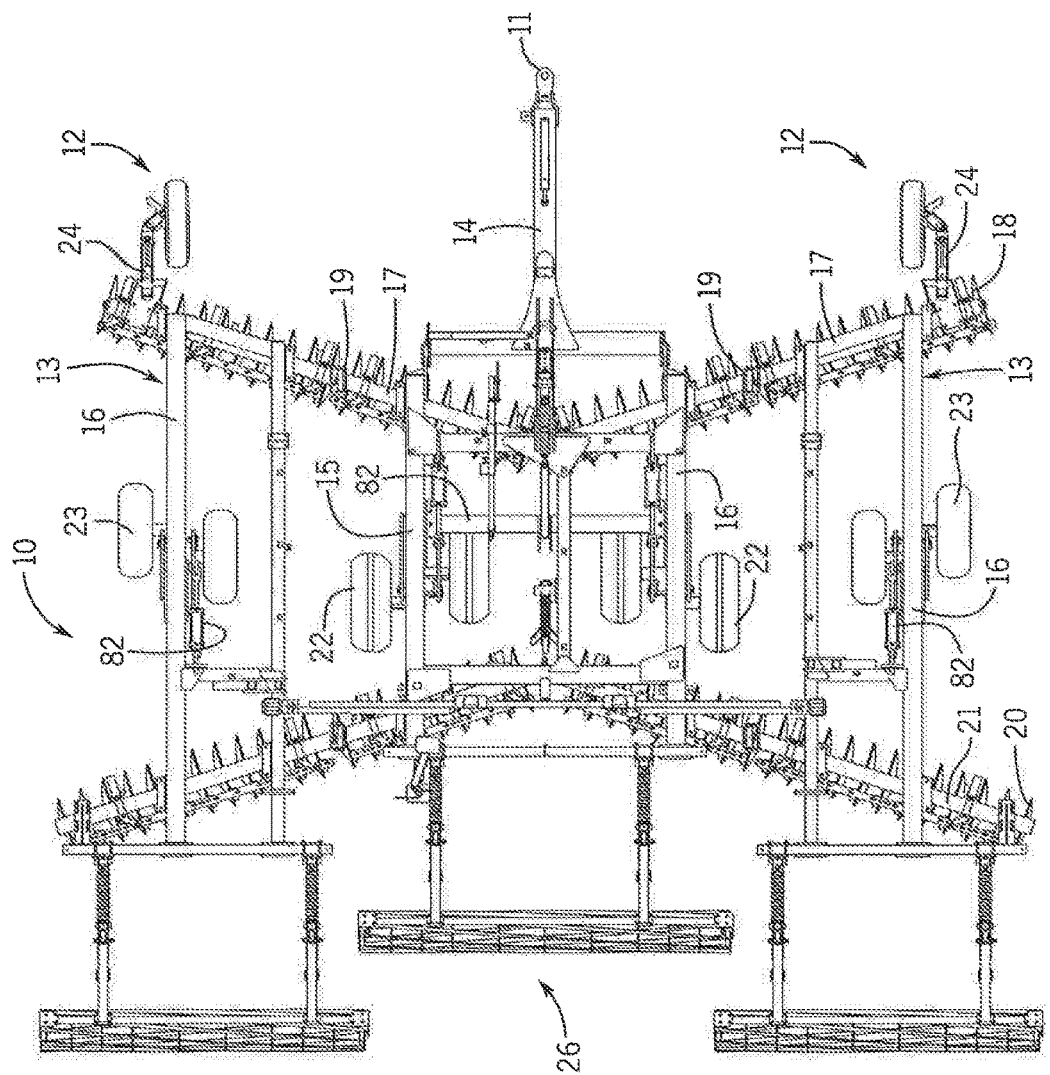
FIG. 2 is an orthographic top view of the exemplary embodiment of the implement of FIG. 1.
Figure 3:
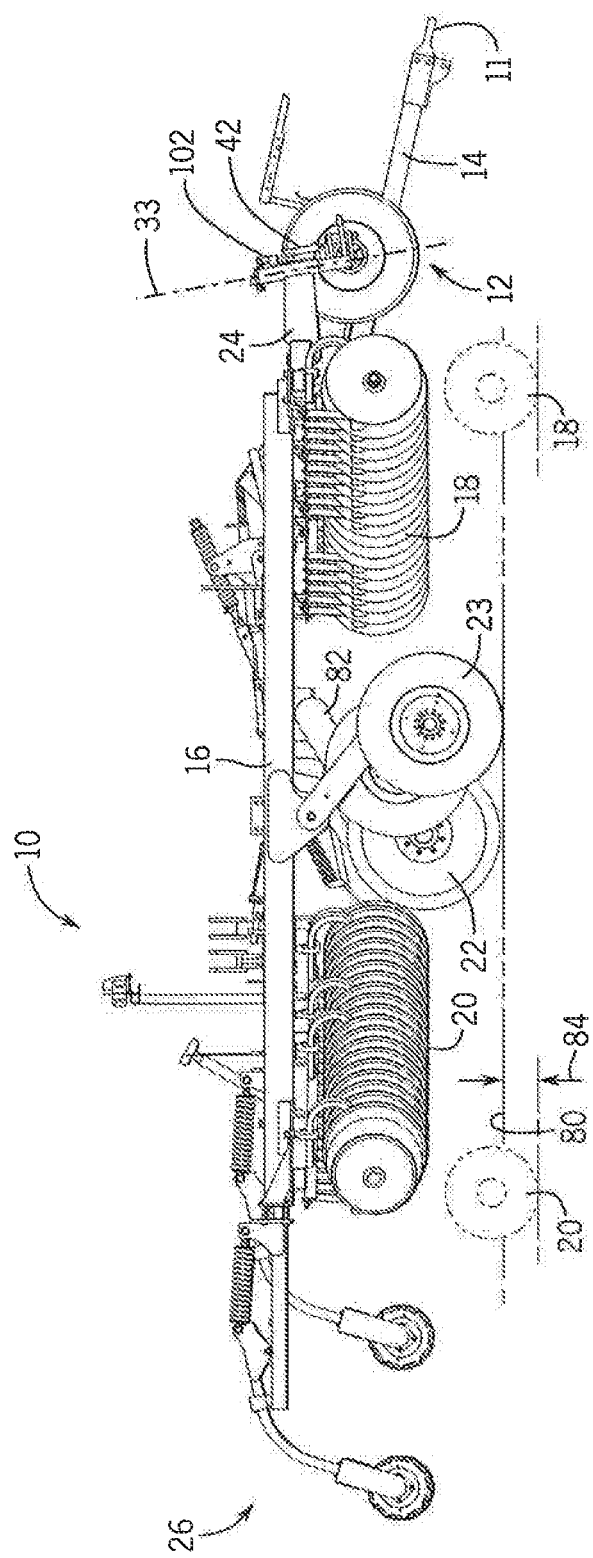
FIG. 3 is an orthographic side view of the exemplary embodiment of the implement of FIG. 1, showing the implement in a raised position for field transport, with stabilizer wheels and tillage tools of the implement raised off of the ground.

As shown in FIGS. 1-3, the disk 10 is supported above a ground surface 80 by two pairs of tandem support wheels 22,22, and right and left pairs of wing frame support wheels 23,23. The pairs of support and wing frame wheels 22,22, 23,23 are all operatively attached to the frame 16 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13 are lowered, as shown in FIGS. 1-3, the support wheels 22,22 and wing frame wheels 23,23 all act together to support the disk 10 above the ground surface 80. In FIG. 3, the disk 10 is shown in a raised, field transport condition, where the wheels 22,22,23,23 and depth control arrangement 82 have lifted the disk gangs 18,20 out of contact with the ground surface 80. When the wing frames 13 are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13,13 are raised above the main frame 15 to narrow the disk 10 for towing on a public roadway, a part of the depth control arrangement 82 attaching the transport wheels 22,22 to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form rotating crumblers 26 operatively attached to the rear of the disk 10.

As best seen in FIGS. 1 and 2, the disk 10 includes two remotely adjustable left and right stabilizer wheel arrangements 12,12 which are respectively located near the left and right front extremities of front tool bar 17. In various embodiments of the invention, the stabilizer wheel arrangements 12,12 may be operatively attached directly to the main frame 15 or wing frames 13 of the frame 16, or alternatively attached to the front tool bar 17

As discussed above, the main frame 15 and wing frames 13,13 are joined together by a plurality of hinged connections 19, that allow the wing frames 13,13 to be folded above the main frame 15. The disk 10 is further configured to utilize these hinged connections 19 in a manner that allows the wing frames 13,13 to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13,13 to bounce, under certain tillage conditions, and also contribute to the outer corners of the front disk gangs 18,20 undesirably digging too deeply into the ground surface 80, during turning or maneuvering the disk 10 around an obstacle. Accordingly, the remotely positionable stabilizer wheel arrangements 12,12 of the exemplary embodiment of the disk 10 are advantageously attached to the wing frames 13,13, or the front tool bar 17 near the front left and right front corners of the disk 10. Positioning the remotely positionable stabilizer wheel arrangements 12,12 in this manner maximizes their effectiveness in damping out wing bounce and/or undesirable digging-in of the front disk gang 18.

The stabilizer wheel arrangements 12,12 are properly adjusted to maintain only light contact pressure with the ground surface 80, until they come into operation due to a change in the terrain, so as to not interfere with operation of the depth control arrangement 82 and support and transport wheels 23,23,22,22 in maintaining a desired depth of penetration 84 of the front and rear disk gangs 18,20 below the ground surface 80. The stabilizer wheel arrangements 12,12 of the exemplary embodiment are also pivotable by interaction with the ground surface 80, to enhance overall maneuverability and operation of the disk 10. Having a light contact pressure aids in proper pivoting motion of the wheel arrangements 12,12.

FIGS. 4 and 5 illustrate an exemplary embodiment of the remotely hydraulically positionable stabilizer wheels 12, 12, of the exemplary embodiment of the disk 10. The left and right remotely positionable stabilizer wheel arrangements 12,12 of the exemplary embodiments described herein are left and right-hand assemblies of identical groupings of component parts.

FIGS. 4 and 5 show the left front remotely positionable stabilizer wheel arrangement 12 of the disk 10. The exemplary embodiment of the remotely positionable stabilizer wheel arrangement 12 includes a support strut 28, a support strut bracket 24, a stabilizer wheel 46, a hydraulic cylinder 42, a hydraulic control arrangement 104, a stabilizer wheel pressure sensor P, and an electronic control unit 100.

The support strut 28 has a first, lower, end 34 thereof adapted for mounting the stabilizer wheel 46 to the support strut 28 in a manner that allows the stabilizer wheel 46 to roll about a substantially horizontal rotational axis 47 when the stabilizer wheel 46 is in contact with the ground surface 80. As will be described in more detail below, the lower end of the support strut 28 is configured to form a pivot bracket 34, and connected to the stabilizer wheel 46 in a manner that allows the wheel 46 to pivot to a limited about a pivot axis 33 that extends in a generally up and down, non-horizontal direction, to thereby facilitate pivoting of the stabilizer wheel 46 and maneuverability of the disk 10.

The support strut bracket 24 has a first end 41 thereof adapted for attachment to the implement frame 16, or the front tool bar 17. In the embodiments shown in FIGS. 4 and 5, the first end 41 of the support strut bracket is configured as a bolt-on clamping arrangement. In other embodiments, the first end 41 of the support strut bracket may be configured for attachment by any appropriate method, such as a through a bolting flange or by welding. The second, distal, end 30 of the support strut bracket 24 is configured for slidable engagement with a second end 32 of the support strut 28, in a manner allowing the stabilizer wheel 46 to alternatively be lowered into contact the ground surface 80, or raised out of contact with the ground surface 80.

A first, lower, end 45 of the hydraulic cylinder 42 is operatively attached to a pair of ears 44 of the pivot bracket 34 at the lower end of the support strut 28 by a pivoting pin or bolted connection. The other, upper, end thereof of the hydraulic cylinder 42 is operatively attached through a pivotable pinned or bolted connection to a second pair of ears 50 fixedly attached to the second end 30 of the support strut bracket 24. By virtue of this arrangement, the support strut 28 can be extended or retracted with respect to the strut bracket 24 by corresponding extension and retraction of the hydraulic cylinder 42, to thereby respectively lower and raise the stabilizer wheel 46 into, and out of contact with the ground surface 80. In the exemplary embodiments shown in FIGS. 4 and 5, the hydraulic cylinder 42 is a double-acting cylinder, but those having skill in the art will recognize that the invention may also be practiced with efficacy in embodiments of the invention that utilize a single-acting cylinder.

As shown in FIG. 4, a hydraulic pressure sensor P is operatively connected in the hydraulic circuit for indicating a present hydraulic cylinder fluid pressure in the hydraulic cylinder 42. In the exemplary embodiment shown in the FIGS., the pressure sensor 102 is part of a valve spool arrangement of the hydraulic control arrangement 104, and provides a present pressure signal 116 to the control unit 100 that is indicative of the present hydraulic cylinder fluid pressure in the hydraulic cylinder 42. The invention may be practiced with any appropriate form of a hydraulic pressure sensor, positioned at any appropriate location in the hydraulic circuit.

It will be appreciated that the pressure in the hydraulic cylinder 42 is indicative of contact, or lack of contact, of the stabilizer wheel 46 with the ground surface 80, and of the force being exerted on the ground surface 80 by the stabilizer wheel 46.

As illustrated schematically in FIG. 4, the hydraulic control arrangement 104 is operatively connected to the hydraulic cylinder 42 for controlling extension and retraction of the cylinder 42 in response to a cylinder control electrical signal 118 received from the electronic control unit 100. It is contemplated that the hydraulic control arrangement 104 may take the form of any suitable electrically controlled source of hydraulic power, available as a part of the disk 10 or in the towing vehicle. The invention provides a particular advantage, however, when the control unit 100 is mounted on the implement 10, in that interconnections and communication between the towing vehicle and the disk are simplified to the point that more complex communication and controls such as ISOBUS Class 3 are not required.

As further illustrated schematically in FIG. 4, the electronic control unit 100, of the remotely positionable stabilizer wheel arrangement 12, is further operatively connected to the pressure sensor P to receive the present hydraulic cylinder fluid pressure in the hydraulic cylinder 42 from the pressure sensor 102. As further illustrated schematically in FIG. 4, the electronic control unit 100 is configured to also receive a desired stabilizer wheel position input 120 from an external source, such as a command from an operator of the towing vehicle, inputted through a touchscreen 101 or other input device located in the cab of the towing vehicle. The electronic control unit 100 is internally configured for providing the cylinder control electrical signal 118 to the hydraulic control arrangement 104, to thereby cause the hydraulic cylinder 42 to move the stabilizer wheel 46 to, and hold the stabilizer wheel 46 at a present stabilizer wheel position, as indicated by the present hydraulic cylinder fluid pressure signal 116 generated by the pressure sensor P, that corresponds to the desired stabilizer wheel position input 120 received from the external source, or operator input.

In some forms of a remotely positionable stabilizer wheel arrangement 12, according to the invention, the control unit 100 selects a predetermined desired stabilizer wheel cylinder pressure, stored in memory of the control unit 100, corresponding to the desired stabilizer wheel position input 120 and controls the hydraulic control arrangement 104 using a desired stabilizer wheel cylinder pressure that corresponds to the predetermined stabilizer wheel position. In other forms of the invention, the control unit 100 may calculate a computed desired stabilizer wheel cylinder pressure corresponding to the desired stabilizer wheel position input 120, and control the hydraulic control arrangement 104 using the computed desired stabilizer wheel cylinder pressure. For example, where the control input 120 calls for desired extension of 24 inches of the stabilizer wheel 46 with respect to the strut bracket 24, the electronic control unit will either look up a desired stabilizer wheel cylinder pressure signal 116 stored in memory, or calculate a desired present position signal 116, and then issue appropriate commands 118 to the hydraulic power supply 104 to cause the hydraulic cylinder 42 to drive the stabilizer wheel 46 to, and hold the stabilizer wheel 46 at a desired stabilizer wheel cylinder pressure corresponding to a position of 24 inches. If a new desired position input of 23 inches is provided, the above processes would be repeated to adjust the desired stabilizer wheel cylinder pressure to a value corresponding to the new desired present position of 23 inches for the stabilizer wheel 46.

In some forms of the invention, the control unit may be configured to position the stabilizer wheel 46 in response to a desired stabilizer wheel position input signal 120 calling for an incremental adjustment in the desired stabilizer wheel cylinder pressure form a previous desired stabilizer wheel cylinder pressure. For example, where the remotely positionable stabilizer wheel 46 is currently operating at extension distance of 24 inches from the strut bracket 24, the input signal 120 may call for the extension distance to be increased by ½ inch from the present position, causing the electronic control unit 100 to calculate a new desired extension position of the stabilizer wheel at 24½ inches from the strut bracket 24, and control the hydraulic power unit 104 adjust the desired stabilizer wheel cylinder pressure to drive the stabilizer wheel 46 to, and hold the stabilizer wheel 46 at an extension of 24½ inches.

As illustrated schematically in FIG. 4, in some forms of a remotely positionable stabilizer wheel arrangement 12, according to the invention, the electronic control unit 100 may be yet further configured for receiving a desired tillage depth electrical signal 122 and computing a computed desired stabilizer wheel cylinder pressure, and for providing a cylinder control signal 118 corresponding to the computed desired stabilizer wheel cylinder pressure to the hydraulic power unit 104, to thereby cause the hydraulic cylinder 42 to move the stabilizer wheel 46 to, and hold the stabilizer wheel 46 at the computed desired stabilizer wheel position corresponding to the desired depth signal 122. The electronic control unit 100 may be configured for selecting a predetermined desired stabilizer wheel cylinder pressure corresponding to the desired depth electrical signal 122, and controlling the hydraulic control arrangement 104 using the selected predetermined desired stabilizer wheel cylinder pressure. In some forms of the invention the control unit 100 may calculate a computed desired stabilizer wheel cylinder pressure corresponding to the desired depth input 122, and control the hydraulic control arrangement 104 using the computed desired stabilizer wheel cylinder pressure. The desired depth input 122 may indicate the desire to make an incremental adjustment to a previous desired depth of penetration 84, in some embodiments of the invention, by a corresponding incremental adjustment in the desired stabilizer wheel cylinder pressure.

In embodiments of the invention utilizing a desired depth signal 122, it is contemplated that the desired depth signal 122 may be an input from a source such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, the left and right remotely positionable stabilizer wheel arrangements 12,12, according to the invention, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figure 6:
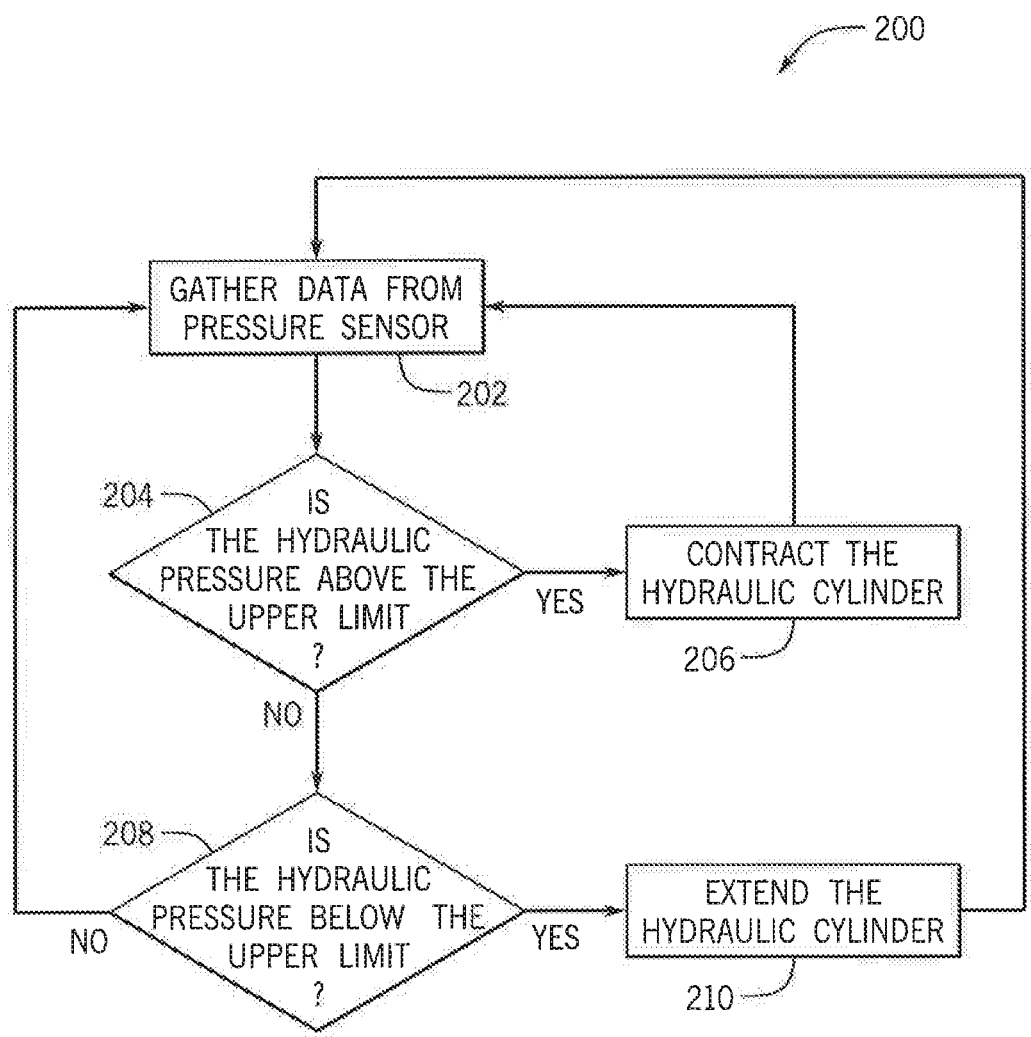
FIG. 6 is a diagram of an exemplary embodiment of a method for operating the remotely positionable stabilizer wheel of FIGS. 1-5.

FIG. 6 shows one potential method 200 for operating the exemplary embodiment of the stabilizer wheel arrangement 12, where, the pressure sensor P is adapted and located for detecting pressure in an upper end 51 of the hydraulic cylinder 42. In such an embodiment, pressure in the upper end of the cylinder will increase as contact with the ground surface 80 causes the stabilizer wheel to be pushed upward, and conversely, pressure in the upper end of the cylinder will decrease as contact with the ground surface 80 falls away from the stabilizer wheel 46, allowing the stabilizer wheel to be pushed downward by pressure in the upper end of the cylinder 42 and pulled downward by the weight of the stabilizer wheel 46 and the stabilizer wheel support strut 28.

In general, according to the method 200 of FIG. 6, the control unit 100 and hydraulic control arrangement 104 of the exemplary embodiment of the remotely positionable stabilizer wheel 12 in the disk 10 are configured to cause the hydraulic cylinder 42 to contract in response to an increase in hydraulic pressure measured by the pressure sensor P, and thereby retract the stabilizer wheel 46 to a position that is closer to the frame 16 of the implement 10. And, to cause the hydraulic cylinder 42 to extend in response to a decrease in hydraulic pressure measured by the pressure sensor P, and thereby extend the stabilizer wheel 36 to a position farther from the frame 16 of the implement 10.

As specifically shown in FIG. 6, at block 202 of the exemplary embodiment of the method 200, the control unit 100 gathers data provided by the pressure sensor P in the form of the present cylinder pressure signal 116.

At block 204, the control unit 100 analyzes the data provided by the pressure sensor P to determine if the hydraulic pressure in the hydraulic cylinder 42 is above a predetermined upper limit. If the hydraulic pressure is above the predetermined upper limit, the method 200 moves to block 206, where the control unit 100 causes the hydraulic cylinder 42 to contract in order to reduce the hydraulic pressure in the hydraulic cylinder 42. Next, the method 200 returns to block 204 to continue analysis of the hydraulic pressure. If the hydraulic pressure is not above the predetermined upper limit, the method 200 moves to block 208.

At block 208, the control unit 100 analyzes the data provided by the pressure sensor P to determine if the hydraulic pressure in the hydraulic cylinder 42 is below a predetermined lower limit. If the hydraulic pressure is below the predetermined lower limit, the method 200 moves to block 210, wherein the control unit 100 causes the hydraulic cylinder 42 to extend in order to increase the hydraulic pressure in the hydraulic cylinder 42 due to increased contact between the stabilizer wheel 46 and the ground surface 80. Next, the method 200 returns to block 200 to continue analysis of the hydraulic pressure. Alternatively, if the hydraulic pressure is above the predetermined lower limit when the method reaches block 208 the method returns to block 200 to continue analysis of the hydraulic pressure in the cylinder 42, rather than proceeding to block 210.

While the method 200 illustrated in FIG. 6 depicts comparing the hydraulic pressure in the hydraulic cylinder 42 to the predetermined upper limit before comparing the hydraulic pressure in the hydraulic cylinder 42 to the predetermined lower limit, it is contemplated that these blocks 204, 208 of the method 200 may occur in any order.

As will be understood from an examination of FIGS. 4-6, in light of the description above, the pressure sensor P is operatively connected for indicating a present cylinder pressure of the cylinder 42, which is directly proportional to the position of the strut 28 and stabilizer wheel 46 with respect to the strut bracket 24, and generates an electrical signal 116 indicative of a present stabilizer wheel position with respect to the strut bracket 24. When the stabilizer wheel 46 is engaging the ground surface 80 at a present cylinder pressure that corresponds to a desired stabilizer wheel position, the present stabilizer wheel position is essentially equal to the distance from the strut bracket 24 to the ground surface 80. Stated conversely, in the exemplary embodiment of the disk 10, the control unit 100 is configured to hold the stabilizer wheel 46 at a selected or computed desired position by controlling pressure in the hydraulic cylinder 42.

Those having skill in the art will appreciate that, through practice of the invention, the stabilizer wheel 46 can be remotely positioned, repositioned, and actively controlled to provide considerably improved functionality and performance of the stabilizer wheel 46, as compared to prior approaches for positioning such stabilizer wheels.

It will also be appreciated that the exemplary embodiment of the invention illustrates a method and apparatus for controlling the positioning of a stabilizer wheel 46 independently from the action of the depth control arrangement 82 in positioning the main transport and outer carrying wheels 22,22,23,23 of the disk 10. This allows the remotely adjustable stabilizer wheel arrangement 12 to compensate to allow for the fact that the stabilizer wheel 46 will generally be in contact with an unfilled area of the ground surface 80 ahead of the tillage tools 19,20, whereas the support wheels 22,22,23,23 will generally be riding on an area of the ground surface 80 that has been least partly tilled, and may therefore be at a different position 79, with respect to the frame 16 of the disk 10 than the position of the stabilizer wheel 46, with respect to the frame 16, as the stabilizer wheel 46 rides upon the unfilled area of the ground surface 80. The present invention allows precise, active control or the stabilizer wheel position during operation of the disk 10 to compensate for this difference in height between the tilled and unfilled areas of the ground surface.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A remotely positionable stabilizer wheel arrangement for an agricultural tillage implement having an implement frame supported above a ground surface by implement support wheels operatively connected to the frame by a depth control arrangement, the stabilizer wheel arrangement comprising:
  a support strut having a first end thereof adapted for mounting a stabilizer wheel thereto;
  a stabilizer wheel operatively attached to the first end of the strut and adapted for engaging the ground surface;
  a support strut bracket adapted for attachment to the implement frame and for slidable engagement with a second end of the support strut;
  a hydraulic cylinder having a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel into and out of contact with the ground surface;
  a hydraulic control arrangement operatively connected to the hydraulic cylinder and providing pressurized hydraulic fluid at a desired hydraulic cylinder fluid pressure for controlling extension and retraction of the cylinder in response to a cylinder control electrical signal;
  a hydraulic pressure sensor operatively connected for indicating a present hydraulic cylinder fluid pressure in the hydraulic cylinder; and
  a control unit operatively connected to the pressure sensor and the hydraulic control arrangement for receiving the present hydraulic cylinder fluid pressure signal and a desired stabilizer wheel cylinder fluid pressure input signal, and configured for providing the cylinder control electrical signal to the hydraulic control arrangement, to thereby regulate and hold the current stabilizer wheel hydraulic cylinder fluid pressure at the desired stabilizer wheel hydraulic cylinder fluid pressure.

2. The remotely positionable stabilizer wheel arrangement of claim 1, wherein:
  the control unit causes the hydraulic cylinder to contract in response to an increase in hydraulic pressure measured by the pressure sensor, and thereby retract the stabilizer wheel to a position closer to the frame of the implement; and
  the control unit causes the hydraulic cylinder to expand in response to a decrease in hydraulic pressure measured by the pressure sensor, and thereby extend the stabilizer wheel to a position farther from the frame of the implement.

3. The remotely positionable stabilizer wheel arrangement of claim 1, wherein the control unit selects a predetermined desired stabilizer wheel hydraulic cylinder fluid pressure corresponding to a desired stabilizer wheel position input and controls the hydraulic power source using the predetermined stabilizer wheel hydraulic cylinder fluid pressure.

4. The remotely positionable stabilizer wheel arrangement of claim 1, wherein the control unit computes a computed desired stabilizer wheel hydraulic cylinder pressure corresponding to a desired stabilizer wheel position input and controls the hydraulic power source using the computed desired stabilizer wheel hydraulic cylinder pressure.

5. The remotely positionable stabilizer wheel arrangement of claim 4, wherein the desired stabilizer wheel hydraulic cylinder pressure input is an incremental adjustment to a previous desired stabilizer wheel hydraulic cylinder pressure.

6. The remotely positionable stabilizer wheel arrangement of claim 1, wherein the control unit is configured for receiving a desired depth electrical signal, and for providing a cylinder control signal to the hydraulic control arrangement corresponding to a desired stabilizer wheel hydraulic cylinder pressure at the desired depth, to thereby cause the hydraulic cylinder to hold the stabilizer wheel hydraulic cylinder pressure at the desired stabilizer wheel hydraulic cylinder pressure corresponding to the desired depth signal.

7. The remotely positionable stabilizer wheel arrangement of claim 6, wherein the control unit selects a predetermined desired stabilizer wheel hydraulic cylinder pressure corresponding to the desired depth electrical signal, and controls the hydraulic power source using the selected predetermined desired stabilizer wheel hydraulic cylinder pressure.

8. The remotely positionable stabilizer wheel arrangement of claim 6, wherein the control unit computes a computed desired stabilizer wheel hydraulic cylinder pressure corresponding to the desired depth input and controls the hydraulic power source using the computed desired stabilizer wheel hydraulic cylinder pressure.

9. The remotely positionable stabilizer wheel arrangement of claim 6, wherein the desired depth input is an incremental adjustment to a previous desired depth of penetration.

10. A towable agricultural tillage implement adapted attachment to a towing vehicle and having an implement frame supported above a ground surface by implement support wheels operatively connected to the frame by a depth control arrangement to thereby control a depth of penetration below the ground surface of tillage tools attached to the frame, and one or more stabilizer wheel arrangements attached to the frame in a manner providing selective stabilizing support of the implement, wherein each of the one or more remotely positionable stabilizer wheel arrangements comprises:
  a support strut having a first end thereof adapted for mounting a stabilizer wheel thereto;
  a stabilizer wheel operatively attached to the first end of the strut and adapted for engaging the ground surface;
  a support strut bracket adapted for attachment to the implement frame and for slidable engagement with a second end of the support strut;
  a hydraulic cylinder having a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel in to and out of contact with the ground surface;
  a hydraulic control arrangement operatively connected to the hydraulic cylinder and providing pressurized hydraulic fluid at a desired hydraulic cylinder fluid pressure for controlling extension and retraction of the cylinder in response to a cylinder control electrical signal;
  a hydraulic pressure sensor operatively connected for indicating a present hydraulic cylinder fluid pressure in the hydraulic cylinder; and a control unit operatively connected to the pressure sensor and the hydraulic control arrangement for receiving the present hydraulic cylinder fluid pressure signal and a desired stabilizer wheel cylinder fluid pressure input signal, and configured for providing the cylinder control electrical signal to the hydraulic control arrangement, to thereby regulate and hold the current stabilizer wheel hydraulic cylinder fluid pressure at the desired stabilizer wheel hydraulic cylinder fluid pressure.

11. The towable agricultural tillage implement of claim 10, wherein:
the control unit causes the hydraulic cylinder to contract in response to an increase in hydraulic pressure measured by the pressure sensor, and thereby retract the stabilizer wheel to a position closer to the frame of the implement; and
the control unit causes the hydraulic cylinder to expand in response to a decrease in hydraulic pressure measured by the pressure sensor, and thereby extend the stabilizer wheel to a position farther from the frame of the implement.

12. The towable agricultural tillage implement of claim 10, wherein the control unit selects a predetermined desired stabilizer wheel hydraulic cylinder fluid pressure corresponding to a desired stabilizer wheel position input and controls the hydraulic power source using the predetermined stabilizer wheel hydraulic cylinder fluid pressure.

13. The towable agricultural tillage implement of claim 10, wherein the control unit computes a computed desired stabilizer wheel hydraulic cylinder pressure corresponding to a desired stabilizer wheel position input and controls the hydraulic power source using the computed desired stabilizer wheel hydraulic cylinder pressure.

14. The towable agricultural tillage implement of claim 13, wherein the desired stabilizer wheel position input is an incremental adjustment to a previous desired stabilizer wheel position.

15. The towable agricultural tillage implement of claim 10, wherein the control unit is configured for receiving a desired depth electrical signal, and for providing a cylinder control signal to the hydraulic control arrangement corresponding to a desired stabilizer wheel hydraulic cylinder pressure at the desired depth, to thereby cause the hydraulic cylinder to hold the stabilizer wheel hydraulic cylinder pressure at the desired stabilizer wheel hydraulic cylinder pressure corresponding to the desired depth signal.

16. The towable agricultural tillage implement of claim 15, wherein the control unit selects a predetermined desired stabilizer wheel hydraulic cylinder pressure corresponding to the desired depth electrical signal and controls the hydraulic power source using the selected predetermined desired stabilizer wheel hydraulic cylinder pressure.

17. The towable agricultural tillage implement of claim 15, wherein the control unit computes a computed desired stabilizer wheel hydraulic cylinder pressure corresponding to the desired depth input and controls the hydraulic power source using the computed desired stabilizer wheel hydraulic cylinder pressure.

18. The towable agricultural tillage implement of claim 17, wherein the desired depth input is an incremental adjustment to a previous desired depth of penetration.

19. A method for remotely positioning a stabilizer wheel arrangement for an agricultural tillage implement having an implement frame supported above a ground surface by implement support wheels operatively connected to the frame by a depth control arrangement, wherein the stabilizer wheel arrangement includes a support strut having a first end thereof adapted for mounting a stabilizer wheel thereto, a stabilizer wheel operatively attached to the first end of the strut and adapted for engaging the ground surface, and a support strut bracket attached to the implement frame and for slidable engagement with a second end of the support strut, the method comprising:
operatively attaching a first end of a hydraulic cylinder to the support strut, and a second end thereof to the support strut bracket for extension and retraction of the strut with respect to the strut bracket by corresponding extension and retraction of the hydraulic cylinder to thereby lower and raise the stabilizer wheel in to and out of contact with the ground surface;
operatively connecting a hydraulic control arrangement to the hydraulic cylinder and providing pressurized hydraulic fluid at a desired hydraulic cylinder fluid pressure for controlling extension and retraction of the cylinder in response to a cylinder control electrical signal;
operatively connecting a hydraulic pressure sensor for indicating a present hydraulic cylinder fluid pressure in the hydraulic cylinder; and
operatively connecting a control unit to the pressure sensor and the hydraulic control arrangement for receiving the present hydraulic cylinder fluid pressure signal and a desired stabilizer wheel cylinder fluid pressure input signal, and providing the cylinder control electrical signal to the hydraulic control arrangement, to thereby regulate and hold the current stabilizer wheel hydraulic cylinder fluid pressure at the desired stabilizer wheel hydraulic cylinder fluid pressure.

20. The method for remotely positioning a stabilizer wheel arrangement of claim 19, further including:
causing the hydraulic cylinder to contract in response to an increase in hydraulic pressure measured by the pressure sensor, and thereby retract the stabilizer wheel to a position closer to the frame of the implement; and
causing the hydraulic cylinder to expand in response to a decrease in hydraulic pressure measured by the pressure sensor, and thereby extend the stabilizer wheel to a position farther from the frame of the implement.

* * * * *